Oct. 31, 1950
A. A. SMITH
2,527,659
CARBONATING APPARATUS
Filed July 1, 1946
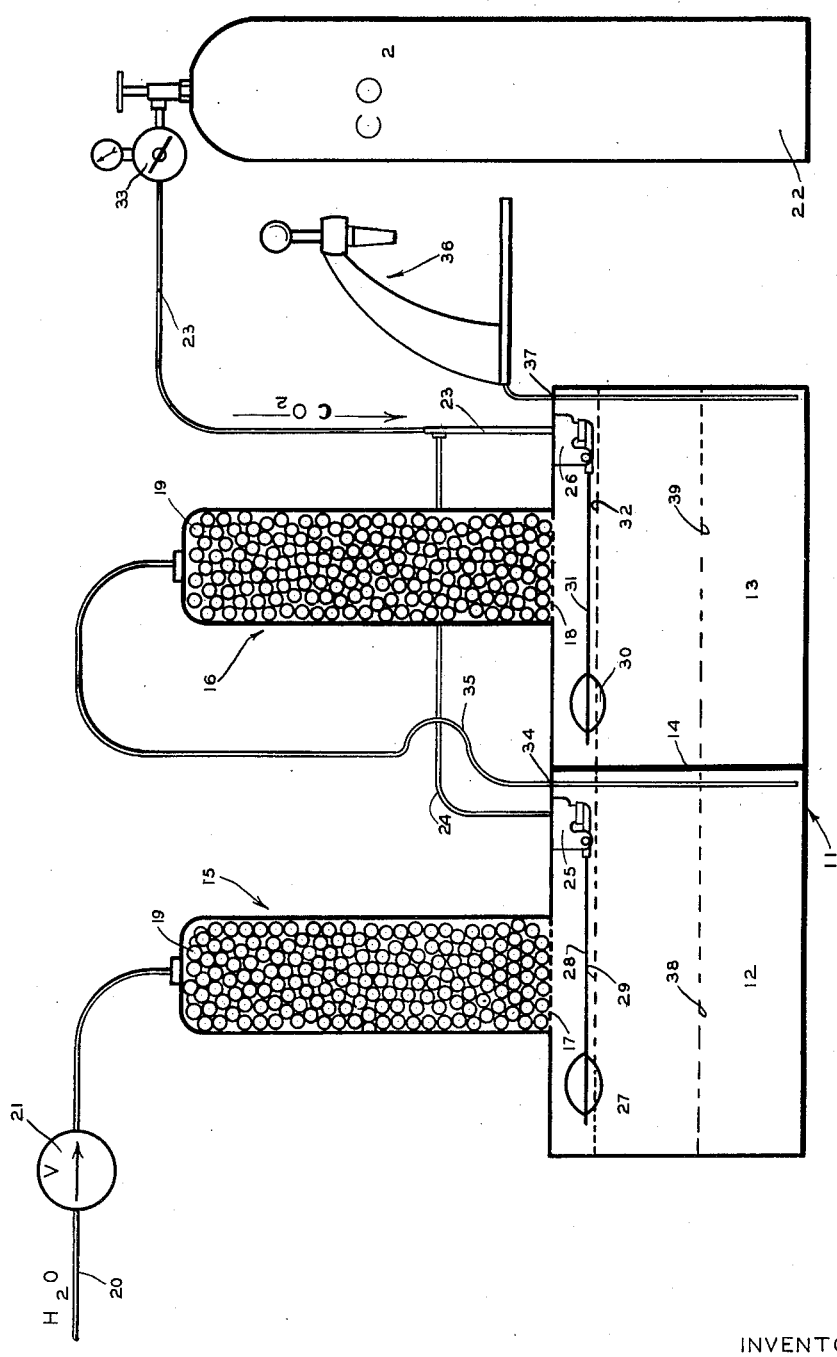
INVENTOR
ARTHUR A. SMITH
BY *John H. Cassidy*
ATTORNEY Patented Oct. 31, 1950

2,527,659

UNITED STATES PATENT OFFICE 2,527,659

CARBONATING APPARATUS

Arthur A. Smith, St. Louis, Mo., assignor to Arthur K. Smith, Gloucester, Mass.

Application July 1, 1946, Serial No. 680,789

3 Claims. (Cl. 261—21)

This invention relates to apparatus for aerating or carbonating liquids.

It is an object of the invention to provide an improved method for aerating or carbonating a liquid which gives a higher ratio of gas absorption and a greater permanency of charge.

Another object of the invention is to provide improved apparatus for aerating or carbonating liquids, which has a minimum number of working parts; is noiseless; requires no driving motor, pump, belt, chain, pulley or agitator for its operation; is entirely automatic and is compact in size.

A further purpose of the invention is the provision of apparatus for aerating or carbonating a liquid in which the liquid and gas are maintained under pressure with an average gas pressure higher than that of the liquid input pressure.

Still another object of the invention is to provide a liquid aerating or carbonating device in which any desired water volume-gas volume ratio may be maintained.

Another object of the invention is to provide such a device which is compact or small in size, whereby it may be placed in a small refrigerated space and its efficiency thereby increased.

Other objects and advantages will become apparent as the description proceeds and a more comprehensive understanding of the invention will be afforded from the following detailed specification when considered in conjunction with the accompanying drawing in which Fig. 1 is a schematic view illustrating the invention in a preferred embodiment thereof.

As is illustrated in the figure, apparatus for aerating or carbonating a liquid is shown comprising in part, a closed vessel 11 which is divided into two compartments 12 and 13 by means of a sealed partition 14. The vessel 11 supports on top of each of the compartments 12 and 13 two domes 15 and 16. The dome 15 communicates with the compartment 12 by means of a perforated plate 17. In a similar manner the dome 16 communicates with the compartment 13 through a perforated plate 18. Each of the domes 15 and 16 contain divided material such as marbles 19 and the former has connected into the top thereof a liquid inlet pipe 20 which may be connected to any suitable supply source, such as a water main or the like. Within the pipe 20 a check valve 21 is connected which prevents counterflow when pressure within the device is higher than that in the water supply line.

Both of the compartments 12 and 13 are arranged to receive an aerating gas such as carbon dioxide from a pressure tank 22. From this tank a line 23 and a line 24, supplying the compartments 12 and 13, connect with two automatically operated valves 25 and 26 which are contained respectively within the compartments 12 and 13. A liquid float 27 controls the valve 25 through a fulcrumed arm 28 and is arranged to open this valve when the liquid level in the compartment reaches a predetermined height, such as that indicated by the line 29. Similarly a float 30 controls the valve 26 through a fulcrumed arm 31 and this float is likewise arranged to open the valve 26 when the liquid level within the compartment 13 reaches a height such as that indicated by the line 32.

The pressure of the aerating gas within the tank 22 is usually much higher than the pressure at which the aerating device can be operated and accordingly a regulator 33 is inserted in the line 23 to vary the operative gas pressure active within the compartments 12 and 13 as desired.

In operation, the liquid such as water is admitted to the apparatus by means of the supply line 20 through the check valve 21. This liquid is discharged into the dome 15 wherein it is divided to provide a large surface of exposure by trickling or falling over the divided particles 19.

This division of the liquid is effected in the presence of the aerating gas which is admitted into the dome and an unoccupied portion of the compartment 12 through the valve 25. In the presence of the aerating gas, the liquid is charged and falls into the bottom of the compartment 12 where it is permitted to rise until it reaches a predetermined maximum level such as that indicated at 29. When the aerated liquid reaches this predetermined level the float 27 is raised upwardly, opening the valve 25, permitting a charge of the aerating gas to flow into the dome 15 and compartment 12.

In a similar manner aerated liquid supplied from the compartment 12 is taken from an outlet opening 34 therein by means of a pipe 35 and discharged into the top of the dome 16. Here the liquid withdrawn from the compartment 12 is further aerated by cascading it over the divided particles 19 in the presence of the gas admitted into the dome 16 and the compartment 13 by means of the float controlled valve 26. Here also, the level of the liquid in the compartment 13 is employed as a control means for the admission of the aerating gas into this compartment, the same being affected by the float 30 which is raised to open the valve 26 when the liquid level attains a height such as that indicated by the line 32. A draft arm 36, or other service outlet or faucets, which is connected by a line to an outlet opening 37 in the compartment 13, transmits the aerated fluid to its point of use.

While it is not intended to limit the invention to any particular theory of operation, one of its essential features may be described as residing in the effective liquid gas volume ratio control provided by the device. This theory may be explained by considering a cycle of its operation from an assumed point represented by the static conditions existing at the time when the aerated liquid has reached the levels indicated by the lines 29 and 32.

Under such conditions the aerating gas is admitted through the valve 25 into the dome 15 and the unoccupied portion of the compartment 12. As the gas pressure increases, it becomes operative to close the check valve 21 and cut off the flow of liquid into the dome 15. The valve 25 is thereafter throttled or closed by the lowering of the liquid level due to withdrawal of carbonated water, and the aerating gas charge is restricted to its active area. In a similar manner the dome 16 and an unoccupied portion of the compartment 13 is charged with aerating gas.

The two compartments will be charged with gas at about the same time since the liquid levels as well as the pressures will tend to be equalized. The compartments will be charged with gas to the full pressure of the gas supply line, unless of course, an immediate withdrawal of carbonated water at the arm 36 lowers the level of water in the two tanks to close the gas inlet valves 25 and 26 before the compartments are fully charged.

After the compartments 12 and 13 are charged with gas, or while they are being charged, withdrawal through the arm 36 will cause a lowering of the liquid in the compartment 13, whereupon the float 30 will fall to close the gas valve 26. Difference in the pressures of the two compartments then will cause liquid to flow from the compartment 12 through the line 35 into the dome 16 of the compartment 13. This will continue each time carbonated water is withdrawn at the arm 36. Thus the pressure as well as the liquid volumes in the two compartments will tend to equalize each other.

It will be noted that there is a difference in the operation of the two stages. Liquid will flow into the dome 16 of the compartment 13 whenever carbonated water is withdrawn at the arm 36. But, liquid will flow into the dome 15 of the compartment 12 only when the pressure in the compartments falls below the water pressure in the water supply line 20. Thus it will be seen in the second chamber 13 water will flow over the divided particles 19 while the gas pressure is at varying pressures varying between maximum and minimum pressures, whereas water will only flow into the first chamber 12, or its dome 15, while its gas pressure is slightly below water supply pressure. Therefore, it will be seen that carbonation will be more effective in the second chamber than in the first, due to higher gas pressures and because the period of cascading of the liquid is longer. It trickles into the second compartment 13 while the liquid level therein is both rising and falling, while in the first chamber 12, of course, it trickles in only while its level is rising.

There is a definite relationship between water pressure, gas pressure, minimum gas volume and maximum gas volume, under the pressure-volume law that gas volume is inversely proportioned to its pressure, temperature remaining constant.

By way of illustration, and for this purpose only, quantitative values may be taken which may be expressed in terms of the equation $$\frac{P1}{P2} = \frac{V1}{V2}$$

where $P1$ equals minimum-gas pressure, $P2$ equals maximum gas pressure, $V1$ equals maximum gas volume and $V2$ equals minimum gas volume. Thus, if the water supply pressure is considered to be 50 pounds per square inch and the gas pressure active at the valves 25 and 26 is 100 pounds per square inch and if it be further assumed that the minimum gas volume, including the domes, which is available when the liquid level reaches its predetermined height, is ⅓, and the maximum gas volume available when the liquid level reaches its minimum height, indicated by lines 38 and 39, as being ⅔, then as aerated liquid is withdrawn the pressure within the compartments 12 and 13 will drop. As the gas volume approaches its maximum, its pressure will be reduced to approximately 50 pounds and the check valve 21 will open to admit fluid into the compartment 12. As this process continues and as the aerating gas is absorbed by the liquid, the liquid levels within the compartments will rise until they reach the maximum predetermined level wherein the aerating gas under pressure will be admitted to close the check valve 21. Thus it is seen that by an adjustment of the floats 27 and 30 and the regulator 33 any desired pressure-volume ratio may be maintained. Such adjustment provides for the complete control of the degree of aeration of the liquid.

Although the device has been illustrated and described as employing two stages in series, it is not intended to limit the invention thereby. One or more stages may be operated with satisfactory results, but experimentation has proven the two stage device to be the more desirable. Aeration is more completely effected with two stages than by a single stage, but additional stages over the dual arrangement do not give appreciably better results.

The use of two stages results in higher absorption of carbon dioxide by the water. But in addition an improved result is had by obtaining a more lasting or stable carbonated water. That is to say with two carbonated waters, both having the same relative volumes of water and carbon dioxide but one produced by one stage only, and the other produced with two stages, the stability of the solution in the second water when exposed to the atmosphere is much superior to the first. This has been ascertained empirically, and the theory is uncertain. But it may be advanced, that in the case of the single stage operation, some of the entrained carbon dioxide is relatively free, while this relatively free entrained gas is forced into a true solution by the successive operation in the second stage.

It will be apparent to those skilled in the art that the withdrawal from the device must be made at a reasonable rate if successful operation is to result. In this regard it is to be recalled, that the withdrawal of aerated fluids for use such as at soda fountains and the like is made in small quantities and that such withdrawals are intermittent. This provides ample time lags for complete aeration and for the proper operation of the device.

Various changes may be made in the details of construction, within the scope of the appended claims, without departing from the spirit of this invention. Parts of the invention may be used without the whole and improvements may be added while retaining some or all of the advantages of the invention.

I claim:

1. In mechanism for carbonating or aerating water having a water supply line under pressure and a carbon dioxide supply line under greater pressure, the combination comprising a first pressure vessel, a port open to said water supply line, a check valve in the water supply line, a connection between the vessel and a carbon dioxide supply line including a valve, a float constructed, connected and adapted to open the valve when water level in said vessel rises to a predetermined height and to close the valve when the water falls to substantially said height, an outlet means in said first vessel for drawing carbonated water therefrom, means connecting said outlet means with a second pressure vessel, a second supply source of carbon dioxide having connecting means with said second vessel and having a valve therein, a second float constructed in said second vessel connected and adapted to open said second valve when water level in said second vessel rises to a predetermined height and to close the valve when water falls to substantially said height, and an outlet means in said second vessel for the withdrawal of carbonated water therefrom at will for use, said first and second vessels being controlled whereby water is supplied automatically and continuously to each of said first and second vessels while and only while the pressure in each is below the pressure of the inlet line thereto and whereby carbon dioxide is supplied automatically to each vessel while and only while the liquid level in each of said vessels is above a predetermined height.

2. In mechanism for carbonating or aerating water having a water supply line under pressure and a carbon dioxide supply line under greater pressure, the combination comprising a pressure vessel having a port open to said water supply line, a check valve in the water supply line, a connection between the vessel and the carbon dioxide supply line including a valve, a float constructed, connected and adapted to open the valve when water level in said vessel rises to a predetermined height and to close the valve when the level falls to substantially said height, and an outlet port from said vessel for withdrawal of carbonated water therefrom, whereby water is supplied automatically and continuously to the vessel while and only while the pressure therein is below the pressure in the water supply line, and carbon dioxide is supplied automatically while and only while the water level in the vessel is above a predetermined height; a second pressure vessel, a dome supported on top of said second vessel arranged to communicate therewith, divided material contained within said frame, a line communicating the outlet port from said first vessel with the top of said dome to admit carbonated water from the first vessel and to discharge the same over said divided material, a connection between the second vessel and the carbon dioxide supply line including a valve, a float constructed, connected and adapted to open the last mentioned valve when the water level in said second vessel rises to a predetermined height and to close the valve when the level falls to substantially said height, and an outlet port from said second vessel for withdrawal of carbonated water therefrom at will, whereby water is supplied automatically to said second vessel from the first vessel when the pressure in the second vessel falls below the pressure in the first vessel.

3. In mechanism for carbonating and aerating water having a water supply line under pressure and a carbon dioxide supply line under greater pressure, the combination of a pressure vessel, a dome supported on top of said vessel arranged to communicate therewith, divided material contained within said dome, a connection communicating with said water supply line adapted to admit water into the top of said dome to discharge the same over said divided material, a check valve interposed in said water supply line before said dome, a connection betweeng the vessel and the carbon dioxide supply line including a valve, a flow constructed, connected and adapted to open the valve in said carbon dioxide supply line when the water level in said vessel rises to a predetermined height and to close the valve when the level falls to substantially said height, an outlet port from said vessel for withdrawal of carbonated water therefrom, whereby water is supplied automatically and continuously to the vessel while and only while the pressure therein is below the pressure in the water supply line and whereby carbon dioxide is supplied automatically while and only while the water level in the vessel is above a predetermined height; a second pressure vessel, a dome supported on top of said second vessel arranged to communicate therewith, divided material contained within said dome, a line communicating the outlet port from said first vessel with the top of said dome to admit carbonated water from the first vessel and to discharge the same over said divided material, a connection between the second vessel and the carbon dioxide supply line including a valve, a float constructed, connected and adapted to open the last mentioned valve when the water level in said second vessel rises to a predetermined height and to close the valve when the level falls to substantially said height, and an outlet port from said second vessel for withdrawal of carbonated water therefrom at will, whereby water is supplied automatically to said second vessel from the first vessel when the pressure in the second vessel falls below the pressure in the first vessel.

ARTHUR A. SMITH.

REFERENCES CITED

The following references are of record in the file of this patent:

UNITED STATES PATENTS

| Number | Name | Date |
| --- | --- | --- |
| 549,004 | Noll | Oct. 29, 1895 |
| 758,403 | Youngblood | Apr. 26, 1904 |
| 932,048 | Mower | Aug. 24, 1909 |
| 1,799,354 | Chesny | Apr. 7, 1931 |
| 2,441,419 | Hudson | May 11, 1948 |

FOREIGN PATENTS

| Number | Country | Date |
| --- | --- | --- |
| 218,836 | Great Britain | July 17, 1924 |